(12) United States Patent
Xiang et al.

(10) Patent No.: US 12,530,100 B2
(45) Date of Patent: Jan. 20, 2026

(54) TOUCH PANEL, PREPARATION METHOD THEREFOR, AND DISPLAY DEVICE (71) Applicant: BOE Technology Group Co., Ltd., Beijing (CN)

(72) Inventors: Dalin Xiang, Beijing (CN); Zewen Bo, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/963,445

(22) Filed: Nov. 27, 2024

(65) Prior Publication Data

US 2025/0094009 A1    Mar. 20, 2025

Related U.S. Application Data (63) Continuation of application No. 18/447,284, filed on Aug. 9, 2023, now Pat. No. 12,223,150, which is a continuation of application No. 17/761,208, filed as application No. PCT/CN2021/094793 on May 20, 2021, now Pat. No. 11,762,522.

(30) Foreign Application Priority Data

May 29, 2020   (CN) .......................... 202010476604.9

(51) Int. Cl.
G06F 3/044    (2006.01)

(52) U.S. Cl.
CPC .......... *G06F 3/0446* (2019.05); *G06F 3/0443* (2019.05); *G06F 2203/04102* (2013.01); *G06F 2203/04103* (2013.01)

(58) Field of Classification Search
None
See application file for complete search history.

(56) References Cited

FOREIGN PATENT DOCUMENTS

CN    107315507 A    * 11/2017    .......... G06F 3/0412

* cited by examiner

*Primary Examiner* — Duane N Taylor, Jr.
(74) *Attorney, Agent, or Firm* — Ling Wu; Stephen Yang; Ling and Yang Intellectual Property (57) ABSTRACT A touch panel, a preparation method therefor, and a display device. The touch panel comprises a substrate, a plurality of spaced apart first touch electrodes and a plurality of spaced apart second touch electrodes that are arranged on the same layer on the substrate. The first touch electrodes and the second touch electrodes are insulated from each other. The substrate is also provided with a plurality of grooves, and the orthographic projection of the first touch electrodes and the second touch electrodes on the substrate do not overlap with the orthographic projection of the grooves in the substrate.

16 Claims, 7 Drawing Sheets

TOUCH PANEL, PREPARATION METHOD THEREFOR, AND DISPLAY DEVICE

CROSS-REFERENCE TO RELATED APPLICATIONS

This application is a continuation of the U.S. application Ser. No. 18/447,284, filed on Aug. 9, 2023, which is a continuation of the U.S. application Ser. No. 17/761,208, filed on Mar. 17, 2022, which is a US national phase entry of the International PCT Application No. PCT/CN2021/094793, filed on May 20, 2021, which claims priority of Chinese Patent Application No. 202010476604.9, filed to the CNIPA on May 29, 2020 and entitled "Touch Panel, Preparation Method Therefor, and Display Device," the above-identified applications are hereby incorporated herein by reference in their entireties.

TECHNICAL FIELD

Embodiments of the present disclosure relate to, but are not limited to, the field of display technologies, and in particular relate to a top gate structure, a preparation method thereof, an array substrate, a display device.

BACKGROUND

An Organic Light Emitting Diode (OLED) is an active light-emitting display device, which has advantages such as self-luminescence, wide view angle, high contrast, low power consumption, wide color gamut, thinness and ability of being specially shaped. With continuous development of display technology, the OLED technology is increasingly applied in flexible display and transparent display. The transparent display is an important branch of display technologies, and refers to displaying images in a transparent state, in which a viewer can see not only images in a display device, but also scenes behind the display device, and Virtual Reality (VR)/Augmented Reality (AR) and 3D display functions can be implemented.

With development of flexible display technology, especially development of folding and rolling technology, higher requirements are put on touch panels, wherein on-cell touch (touch electrodes are disposed on an upper glass substrate of display panel) has obvious technical advantages, such as small RC (resistance-capacitance) delay, no shading, small thickness and the like, which is more conducive to folding and rolling.

SUMMARY

The following is a summary of subject matters described in the present disclosure in detail. The summary is not intended to limit the scope of protection of claims.

At present, touch panels are applied in stretchable flexible display devices. When a flexible display device is deformed (e.g., stretching, rolling, folding), a touch electrode is deformed, therefore resistance and capacitance of the mutual capacitance touch electrode is changed. Moreover, after repeated deformation, the touch electrode may be partially disconnected, which leads to unstable changes in touch performance, such as ghost points, disconnection, decreased induction and other problems, which affect an accuracy of touch position judgment and limit deformation amount of the touch panel.

In a first aspect, an embodiment of the present disclosure provides a touch panel, which includes a substrate, multiple first touch electrodes provided at intervals and multiple second touch electrodes provided at intervals on a same layer on the substrate, the first touch electrodes and the second touch electrodes are insulated from each other, and multiple grooves are further provided on the substrate, and an orthographic projection of the first touch electrodes and the second touch electrodes on the substrate does not overlap with an orthographic projection of the grooves on the substrate; and the touch panel further includes an encapsulation layer and a buffer layer, and the encapsulation layer and a second buffer layer are filled in the grooves.

In an exemplary implementation, the touch panel further includes a protective layer covering the first touch electrodes and the second touch electrodes, and the protective layer is filled in the grooves.

In an exemplary implementation, both the first touch electrodes and the second touch electrodes are in a grid structure.

In an exemplary embodiment, multiple sub-pixels provided on the substrate are further included, and the grid structure is provided on the sub-pixels.

In an exemplary embodiment, in the grid structure, each grid corresponds to one sub-pixel or one group of sub-pixels, and a projection of the one or the group of sub-pixels on a plane where the grid is located falls into a corresponding grid.

In an exemplary embodiment, each sub-pixel includes a drive structure layer provided on the substrate and a light-emitting structure layer provided on the drive structure layer for emitting display light, the drive structure layer is connected to the light-emitting structure layer for controlling and driving the light-emitting structure layer.

In the exemplary embodiment, adjacent second touch electrodes or adjacent first touch electrodes are electrically connected by a bridge, the first touch electrodes and the second touch electrodes are located on a same side of the insulating layer, wherein the bridge, and the first touch electrodes and the second touch electrodes are provided on two sides of the insulating layer respectively.

In an exemplary embodiment, the substrate includes a sub-pixel area and a peripheral area located around the sub-pixel area, and adjacent first touch electrodes and/or adjacent second touch electrodes are connected in the peripheral area.

In an exemplary implementation, a floating electrode provided on the substrate is further included, and the floating electrode is provided on a same layer as the first touch electrodes and the second touch electrodes, and the floating electrode is insulated from the first touch electrodes and the second touch electrodes.

In a second aspect, an embodiment of the present disclosure further provides a touch panel, which includes a substrate, multiple first touch electrodes provided at intervals and multiple second touch electrodes provided at intervals on a same layer on the substrate, wherein adjacent second touch electrodes or adjacent first touch electrodes are electrically connected by a bridge, and multiple grooves are further provided on the substrate, and an orthographic projection of the first touch electrodes and the second touch electrodes on the substrate does not overlap with an orthographic projection of the grooves on the substrate, and an orthographic projection of the bridge on the substrate does not overlap with the orthographic projection of the grooves on the substrate.

In an exemplary implementation, at least one of the bridges is located between adjacent grooves.

In an exemplary implementation, touch panel further includes an encapsulation layer and a buffer layer, wherein at least one of the bridges is located between adjacent grooves, and the encapsulation layer and a second buffer layer are filled in the grooves.

In an exemplary implementation, a distance from the encapsulation layer or the buffer layer to the substrate at the grooves is smaller than a distance from the encapsulation layer or the buffer layer to the substrate at the touch electrodes.

In an exemplary implementation, both the first touch electrodes and the second touch electrodes are in a grid structure.

In an exemplary embodiment, multiple sub-pixels provided on the substrate are further included, and the grid structure is provided on the sub-pixels.

In an exemplary embodiment, in the grid structure, each grid corresponds to one sub-pixel or one group of sub-pixels, and a projection of the one or the group of sub-pixels on a plane where the grid is located falls into a corresponding grid.

In an exemplary embodiment, each sub-pixel includes a drive structure layer provided on the substrate and a light-emitting structure layer provided on the drive structure layer for emitting display light, the drive structure layer is connected to the light-emitting structure layer for controlling and driving the light-emitting structure layer.

In the exemplary embodiment, adjacent second touch electrodes or adjacent first touch electrodes are electrically connected by a bridge, the first touch electrodes and the second touch electrodes are located on a same side of the insulating layer, wherein the bridge, and the first touch electrodes and the second touch electrodes are provided on two sides of the insulating layer respectively.

In an exemplary embodiment, the substrate includes a sub-pixel area and a peripheral area located around the sub-pixel area, and adjacent first touch electrodes and/or adjacent second touch electrodes are connected in the peripheral area.

In an exemplary implementation, a floating electrode provided on the substrate is further included, and the floating electrode is provided on a same layer as the first touch electrodes and the second touch electrodes, and the floating electrode is insulated from the first touch electrodes and the second touch electrodes.

In a third aspect, an exemplary embodiment of the present disclosure further provides a display device including any of the aforementioned touch panels.

In a fourth aspect, an embodiment of the present disclosure further provides a method for preparing a touch panel, including:

forming grooves on a substrate;

forming multiple first touch electrodes provided at intervals and multiple second touch electrodes provided at intervals on the substrate, such that the first touch electrodes and the second touch electrodes are insulated from each other, and an orthographic projection of the first touch electrodes and the second touch electrodes on the substrate does not overlap with an orthographic projection of the grooves on the substrate.

Other aspects may be understood upon reading and understanding of the accompanying drawings and detailed descriptions.

DETAILED DESCRIPTION

The embodiments of the present disclosure will be described in detail below with reference to drawings. It is to be noted that implementation modes may be implemented in multiple different forms. Those of ordinary skills in the art may easily understand such a fact that implementation modes and contents may be transformed into various forms without departing from spirit and scope of the present disclosure. Therefore, the present disclosure should not be construed as being only limited to the contents recorded in the following implementation modes. The embodiments in the present disclosure and features in the embodiments may be combined randomly with each other if there is no conflict.

In the specification, for convenience, wordings indicating orientations or positional relationships, such as "center", "upper", "lower", "front", "back", "vertical", "horizontal", "top", "bottom", "inside", and "outside", are used for describing positional relationships between constituent elements with reference to the drawings, and are merely for facilitating describing the specification and simplifying the description, rather than indicating or implying that referred devices or elements must have particular orientations, and be constructed and operated in particular orientations. Thus, they cannot be construed as limitations on the present disclosure. The positional relationships between the constituent elements are appropriately changed according to directions in which the constituent elements are described. Therefore, they are not limited to the wordings described in the specification, which may be replaced appropriately according to situations.

In the specification, unless otherwise specified and defined explicitly, terms "mounted", "mutually connected", and "connection" should be understood in a broad sense. For example, a connection may be a fixed connection, or a detachable connection, or an integral connection, it may be a mechanical connection or an electrical connection, it may be a direct connection, or an indirect connection through an intermediate, or an internal communication between two elements. Those of ordinary skills in the art may understand meanings of the above terms in the present disclosure according to situations.

In the present disclosure, "about" refers to that a boundary is defined not so strictly and numerical values in process and measurement error ranges are allowed.

An embodiment of the present disclosure provides a touch panel. A main structure of the touch panel of the embodiment of the present disclosure includes a substrate, multiple first touch electrodes provided at intervals and multiple second touch electrodes provided at intervals on a same layer on the substrate, wherein the first touch electrodes and the second touch electrodes are insulated from each other. Multiple grooves are further provided on the substrate, and an orthographic projection of the first touch electrodes and the second touch electrodes on the substrate does not overlap with an orthographic projection of the grooves on the substrate.

In the touch panel of the embodiment of the present disclosure, the grooves are formed on the substrate, and the orthographic projection of the first touch electrodes and the second touch electrodes on the substrate does not overlap with the orthographic projection of the grooves on the substrate, such that the deformation is concentrated in the grooves when the touch panel is flexibly deformed (such as stretching, rolling and folding), therefore a coupling capacitance area of a touch electrode is located in a peripheral area of a groove with smaller stretching deformation, thereby reducing change of the coupling capacitance between the touch electrodes while avoiding the touch electrodes from breaking during the flexible deformation.

Figure 1:
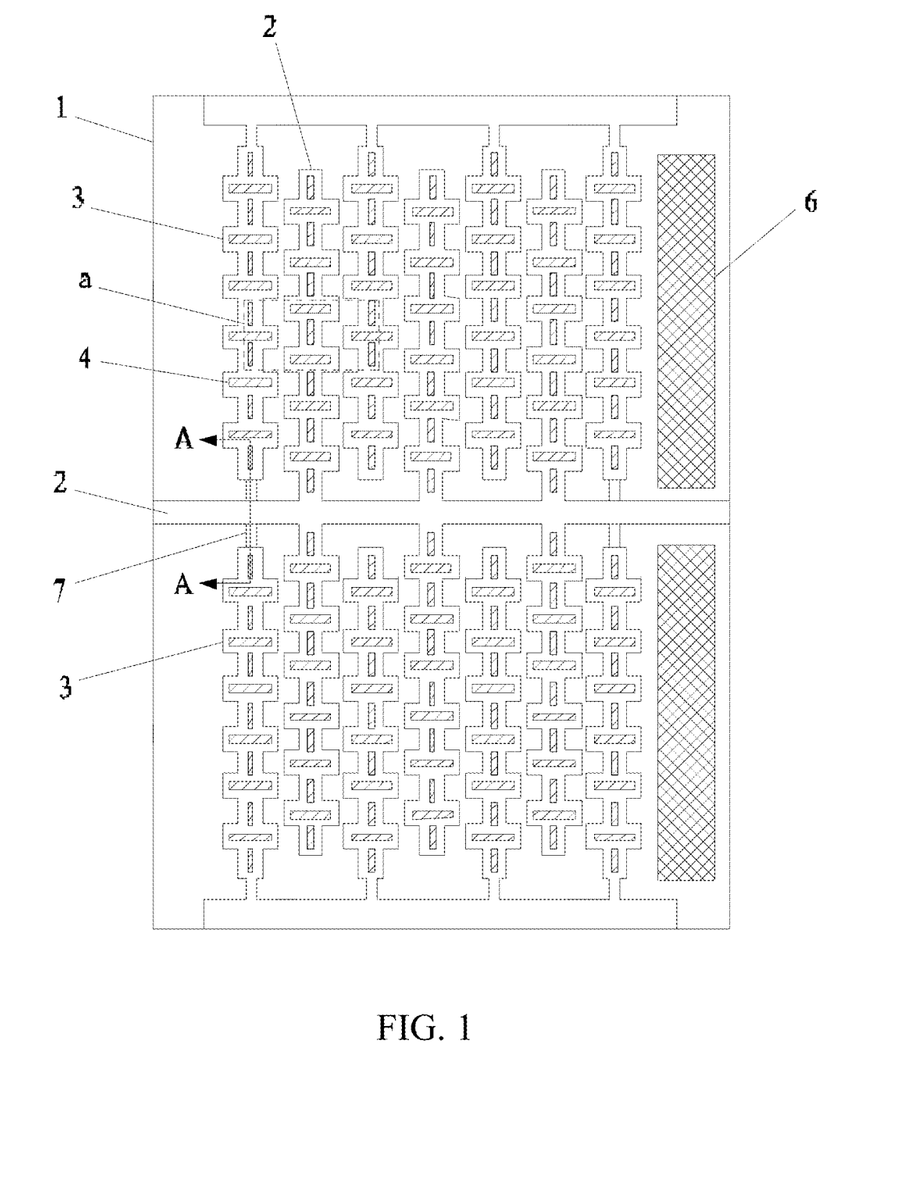
FIG. 1 is a schematic structural diagram of a touch panel according to an embodiment of the present disclosure.
Figure 2:
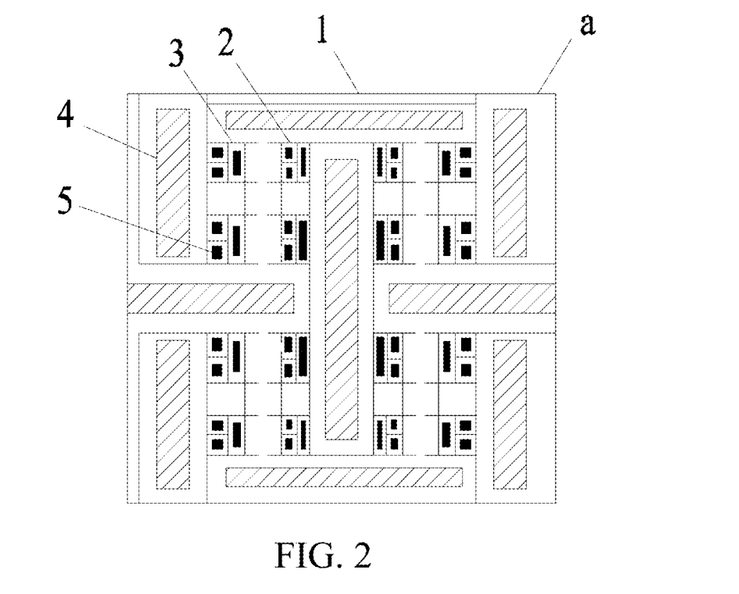
FIG. 2 is an enlarged view of a in FIG. 1.

FIG. 1 is a schematic structural diagram of a touch panel according to an embodiment of the present disclosure. FIG. 2 is an enlarged view of a in FIG. 1. As shown in FIG. 1 and FIG. 2, a planar structure of the touch panel of the embodiment of the present disclosure includes a substrate 1, multiple first touch electrodes 2 provided at intervals and multiple second touch electrodes 3 provided at intervals on the substrate 1, wherein the first touch electrodes 2 and the second touch electrodes 3 are insulated from each other. A coupling capacitance area is formed between a first touch electrode 2 and a second touch electrode 3. In case of touch control, a capacitance of the coupling capacitance area between the first touch control electrode 2 and the second touch control electrode 3 changes, so that an induced signal changes correspondingly, thus a touch position is determined. Among them, one of the first touch electrode 2 and the second touch electrode 3 is a Tx (driving) electrode and the other of the first touch electrode 2 and the second touch electrode 3 is an Rx (sensing) electrode, therefore they cooperate with each other to complete a touch reaction. In a specific implementation, the first touch electrode 2 may be the Tx electrode, the second touch electrode 3 may be the Rx electrode, alternatively, the second touch electrode 3 may be the Tx electrode and the first touch electrode 2 may be the Rx electrode.

As shown in FIG. 1 and FIG. 2, multiple grooves 4 are further provided on the substrate 1, and an orthographic projection of the first touch electrodes 2 and the second touch electrodes 3 on the substrate 1 does not overlap with an orthographic projection of the grooves 4 on the substrate 1, that is, the first touch electrodes 2 and the second touch electrodes 3 are traced in peripheral areas of the grooves 4. The grooves 4 are used for providing a deformation amount when the touch panel is deformed.

In this embodiment, a groove 4 may be a strip groove, wherein an extension direction of the strip groove may be the same as that of the first touch electrodes 2 and the second touch electrodes 3, and the extension direction of the strip groove may be different from that of the first touch electrodes 2 and the second touch electrodes 3. For example, the strip grooves include first strip grooves which have the same extension direction as the first touch electrodes 2 and the second touch electrodes 3, and second strip grooves which have an extension direction perpendicular to the extension direction of the first touch electrodes 2 and the second touch electrodes 3.

As shown in FIG. 2, both the first touch electrodes 2 and the second touch electrodes 3 are in a grid structure. The touch panel of the embodiment of the present disclosure further includes multiple sub-pixels 5 provided on the substrate 1, and the grid structures are provided on the sub-pixels 5. In the grid structure, each grid corresponds to one or a group of sub-pixels 5, wherein a projection of the one or the group of sub-pixels 5 on a plane where the grids are located falls into the corresponding grid, i.e. the grid surrounds the periphery of the sub-pixel 5 so as not to cover the sub-pixel 5, which are in an RBGB arrangement or pentile arrangement for example, and the shape of the grids may be changed according to the sub-pixels.

In a plane perpendicular to the substrate, a sub-pixel includes a drive structure layer provided on the substrate and a light-emitting structure layer provided on the drive structure layer. The light-emitting structure layer is used for emitting display light, and the drive structure layer is connected with the light-emitting structure layer and used for controlling and driving the light-emitting structure layer. The drive structure layer mainly includes a pixel driving circuit formed by multiple Thin Film Transistors (TFTs) and the light-emitting structure layer mainly includes an anode, a light-emitting layer, and a cathode.

In an embodiment, an encapsulation layer and a buffer layer are provided on the light-emitting structure layer in the sub-pixel, wherein a first touch electrode and a second touch electrode are provided on the encapsulation layer and the buffer layer.

In an embodiment, a surrounding dam is formed on the substrate. The surrounding dam is used for protecting a sub-pixel and preventing water and oxygen atoms from entering. The surrounding dam is a continuous dam body, which forms a groove on the substrate. Herein, silicon nitride, silicon oxide, inorganic or organic insulating materials may be used as materials for the surrounding dam.

In an embodiment, the substrate includes a sub-pixel area and a peripheral area located around a periphery of the sub-pixel area. In order to reduce resistance of the touch electrodes, adjacent first touch electrodes and/or adjacent second touch electrodes are connected in the peripheral area.

From the above description of the touch structure, it can be seen that the touch structure is in a mutual capacitance touch structure, and a principle of the touch structure for achieving touch control is that capacitance will be formed between the first touch electrodes and the second touch electrodes. When a finger touches the touch structure, coupling between a first touch electrode and a second touch electrode near the touch point is affected, thereby changing a capacitance value between the first touch electrode and the second touch electrode. During detection of magnitude of the mutual capacitance value, excitation signals are sequentially sent along multiple first touch electrodes, and signals are simultaneously received along all the second touch electrodes, so that capacitance values of intersection points between all the first touch electrodes and all the second touch electrodes can be obtained. Coordinates of each touch point can be calculated from data on capacitance variation quantity of the intersection points between all the first touch electrodes and all the second touch electrodes.

As shown in FIG. 1, the touch panel according to the embodiment of the present disclosure further includes a floating electrode 6 provided on the substrate 1, wherein the floating electrode 6 is provided on a same layer as the first touch electrodes 2 and the second touch electrodes 3, and the floating electrode 6 is insulated from the first touch electrodes 2 and the second touch electrodes 3. The floating electrode 6 is used for reducing the load capacitance of the touch electrodes and cathode to optimize (uniformize) display effects.

Figure 3:
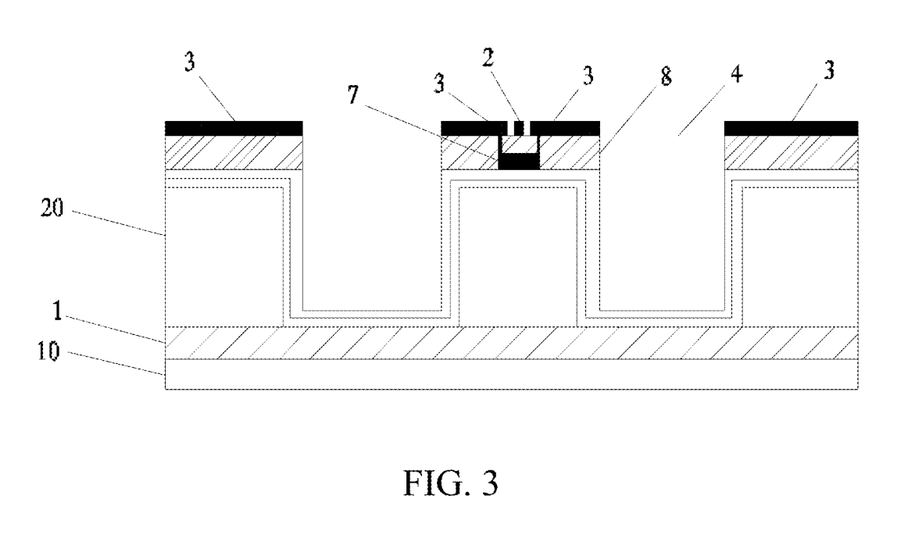
FIG. 3 is a sectional view of A-A in FIG. 1.

FIG. 3 is a sectional view of A-A in FIG. 1. As shown in FIG. 3, in a plane perpendicular to the substrate, adjacent second touch electrodes 2 or adjacent first touch electrodes 3 are electrically connected with each other by a bridge 7. The first touch electrodes 2 and the second touch electrodes 3 are located on a same side of the insulating layer 8, and the bridge 7, and the first touch electrodes 2 with the second touch electrodes 3 are provided on two sides of the insulating layer 8, respectively. With the structure of the bridge 7, the touch panel can obtain a larger amount of induction.

The technical solution of the present embodiment is further described below through a preparation process of a touch substrate according to the present embodiment. The "patterning process" mentioned in the present embodiment includes procedures such as film layer deposition, photoresist coating, mask exposure, development, etching, and photoresist stripping, and is a mature preparation process in the related art. The "photoetching process" in the present embodiment includes coating of film layer, mask exposure and development, and is a mature preparation process in the related art. The deposition may be a known process such as sputtering, evaporation, chemical vapor deposition, the coating may be a known coating process, and the etching may be a known method, which are not specifically limited here. In the description of this embodiment, it should be understood that "thin film" refers to a layer of thin film manufactured by treating a certain material on a substrate with a deposition or coating process. If a patterning process or a photoetching process is not needed for the "thin film" during the entire manufacturing process, the "thin film" may also be referred to as a "layer". If a patterning process or a photoetching process is needed for the "thin film" during the entire manufacturing process, it is referred to as a "thin film" before the patterning process and referred to as a "layer" after the patterning process. The "layer" after the patterning process or photoetching process includes at least one "pattern".

FIG. 3 to FIG. 8 are schematic diagrams showing a preparation process of a touch panel according to this embodiment. A preparation process of the touch panel in the embodiment includes:

(1) A flexible material is coated on a glass carrier plate to form a film after curing to form a substrate. In the embodiment of the present disclosure, a thickness of the substrate is 50 μm to 150 μm. The flexible material may be polyimide (PI), polyethylene terephthalate (PET) or a surface-treated polymer soft film or the like.

Figure 4:
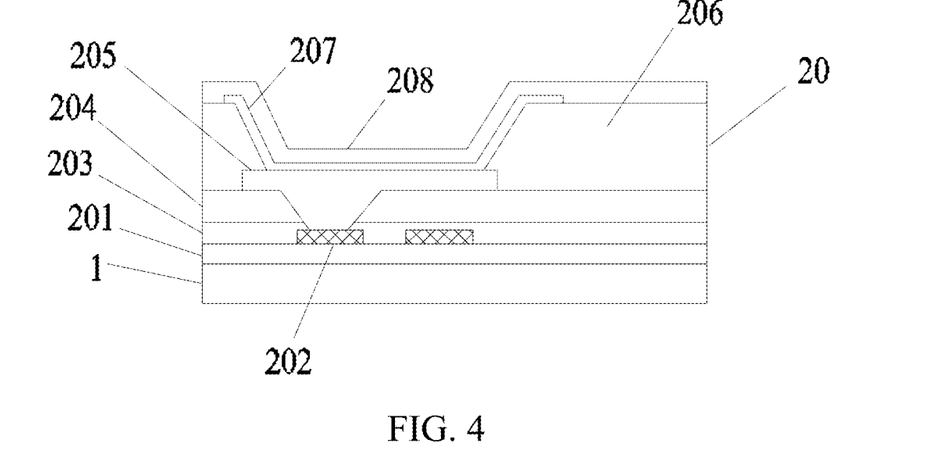
FIG. 4 is a sectional view of a sub-pixel in a touch panel according to an embodiment of the present disclosure.

(2) Sub-pixels are formed on a substrate on the glass carrier plate with the aforementioned structure formed. As shown in FIG. 4, formation of the sub-pixels includes:

A buffer thin film is deposited on a substrate 1, and the buffer thin film is formed into a pattern of a first buffer layer 201 by a patterning process, wherein the buffer thin film may be made of silicon nitride (SiNx) or silicon oxide (SiOx), etc., which is an inorganic material, and may have single layer or a multilayer structure of silicon nitride/silicon oxide. In this embodiment, the first buffer layer is used for improving a water oxygen resistance capability of the substrate.

Subsequently, a source drain thin film is deposited on the first buffer layer 201, and the source drain thin film is patterned by a patterning process to form a pattern of a source drain 202 on the first buffer layer 201.

Subsequently, a passivation thin film is coated on the first buffer layer 201, the passivation thin film is patterned by a patterning process, and a pattern of a passivation layer 203 covering the source drain 202 is formed on the first buffer layer 201. A first via is formed on the passivation layer 203, and the first via exposes the source drain 202.

Subsequently, a pattern of a planarization layer 204 (PLN) is formed on the passivation layer 203, and a second via is formed on the planarization layer 204, and the second via exposes the source drain 202.

Subsequently, a first metal thin film is deposited on the planarization layer 204. The first metal thin film is patterned by a patterning process and an anode 205 is formed on the planarization layer 204. The anode 205 is connected to the source drain 202 through the first via and the second via.

Subsequently, a pixel define layer 206 (PDL) is formed on the planarization layer 204 and a third via exposing the anode 205 is formed in the pixel define layer 206 (PDL).

Subsequently, a light-emitting layer 207 is formed on the anode 205 and a cathode 208 is formed on the light-emitting layer 207, thus the preparation of the sub-pixels 20 is completed.

In a process of preparing the film layers of a sub-pixel, the surrounding dam 30 may be formed by a material of each film layer of the sub-pixel. The material of the surrounding dam 30 may be silicon nitride, silicon oxide, inorganic or organic insulating material or the like and the surrounding dam 30 is used for forming a groove on the substrate 1 to form the groove 4 as shown in FIG. 3.

Figure 5:
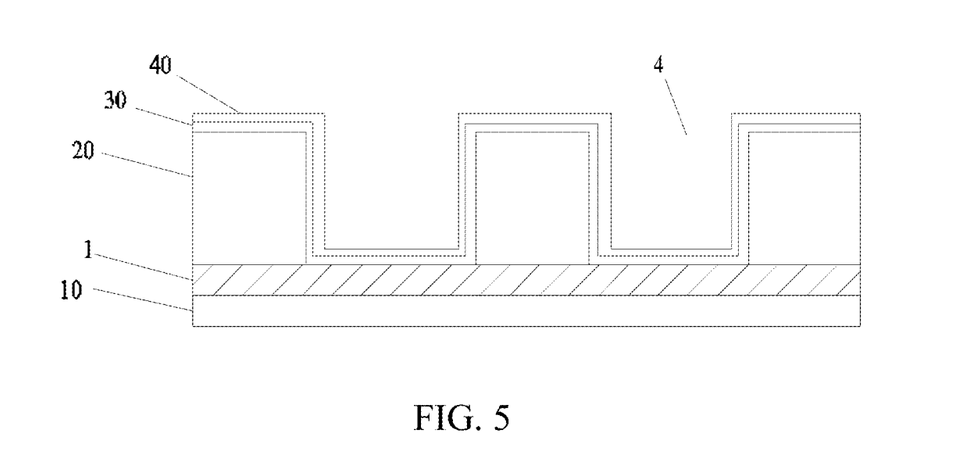
FIG. 5 is a schematic diagram after a sub-pixel, an encapsulation layer and a second buffer layer are formed according to an embodiment of the present disclosure.

(3) An encapsulation layer 30 and a second buffer layer 40 in superposition are sequentially formed on the sub-pixels 20 on the glass carrier plate 10 with the aforementioned structure formed, as shown in FIG. 5.

Figure 6:
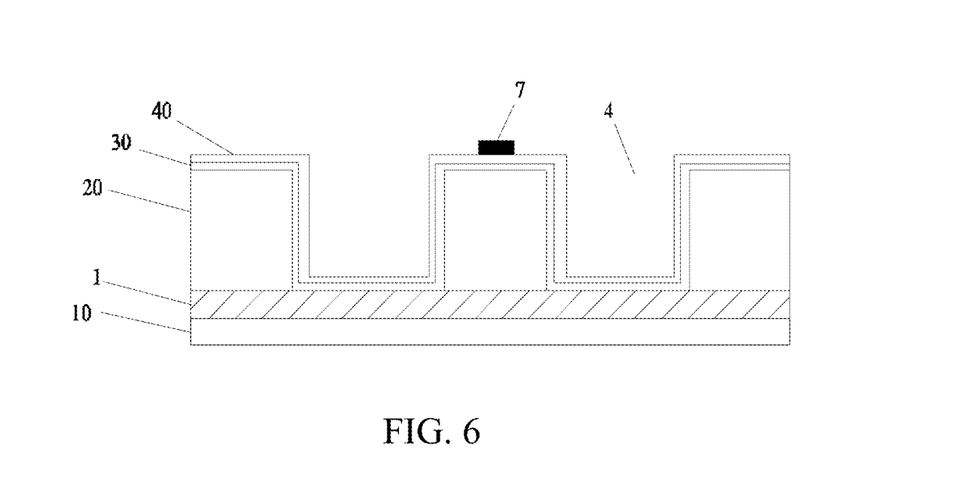
FIG. 6 is a first schematic diagram after a bridge is formed according to an embodiment of the present disclosure.

(4) A second metal thin film is deposited on the second buffer layer 40 on the glass carrier plate 10 with the aforementioned structure formed. The second metal thin film is patterned by a patterning process and a bridge 7 is formed on the second buffer layer 40 as shown in FIG. 6.

Figure 7:
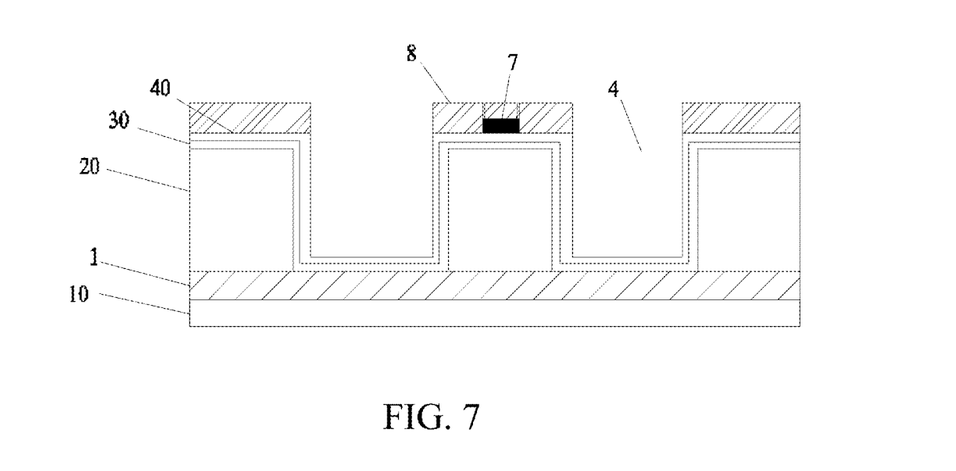
FIG. 7 is a first schematic diagram an insulating layer is formed according to an embodiment of the present disclosure.

(5) An insulating layer 8 on the bridge 7 is formed on the glass carrier plate 10 with the aforementioned structure formed, wherein a fourth via is provided in the insulating layer 8, and the fourth via is communicated with the bridge 7, as shown in FIG. 7.

(6) A third metal thin film is deposited on the insulating layer 8 on the glass carrier plate 10 with the aforementioned structure formed. The third metal thin film is patterned by a patterning process to form first touch electrodes 2 and second touch electrodes 3 on the insulating layer 8, and any adjacent second touch electrodes 3 are connected to the bridge 7 by the fourth via, as shown in FIG. 3.

Figure 8:
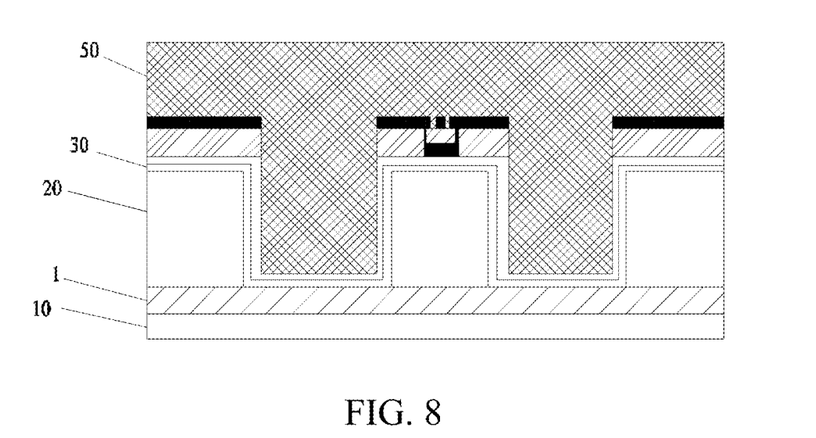
FIG. 8 is a first schematic diagram after a protective layer is formed according to an embodiment of the present disclosure.

(7) A protective layer 50 covering the first touch electrodes 2 and the second touch electrodes 3 is formed on an insulating layer 8 on the glass carrier plate 10 with the aforementioned structure formed, as shown in FIG. 8. A material of the protective layer 50 may be, for example, one or more of silicon oxide, silicon nitride and silicon oxynitride and may be used for protecting the touch structure and make an upper surface of the touch structure planar, so as to facilitate the subsequent preparation of other film layers on the touch substrate.

In some embodiments, grooves are formed on sub-pixels.

Specifically, FIG. 9 to FIG. 14 are schematic diagrams showing a preparation process of a touch panel according to the present embodiment. The preparation process of the touch panel in this embodiment includes:

(1) A flexible material is coated on a glass carrier plate 10 to form a film after curing to form a substrate 1. In the embodiment of the present disclosure, a thickness of the substrate is 50 μm to 150 μm. The flexible material may be polyimide (PI), polyethylene terephthalate (PET) or a surface-treated polymer soft film or the like.

Figure 9:
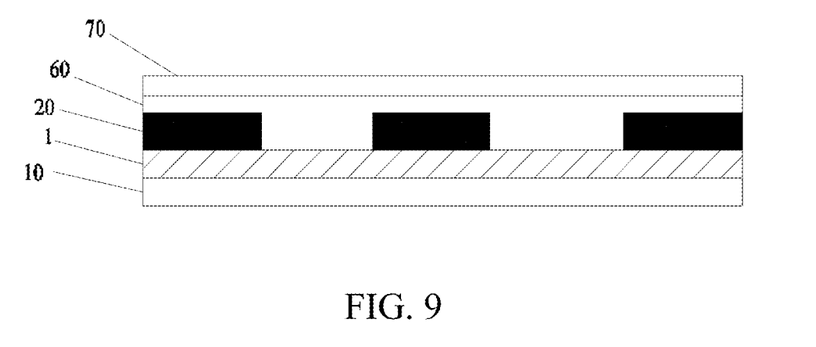
FIG. 9 is a schematic diagram after a sub-pixel, a first encapsulation layer and a barrier layer are formed according to an embodiment of the present disclosure.

(2) Sub-pixels 20 are formed on the substrate 1 on the glass carrier plate 10 with the aforementioned structure formed, and then a first encapsulation layer 60 and a barrier layer 70 in superposition are sequentially formed on the sub-pixels 20, as shown in FIG. 9.

Figure 10:
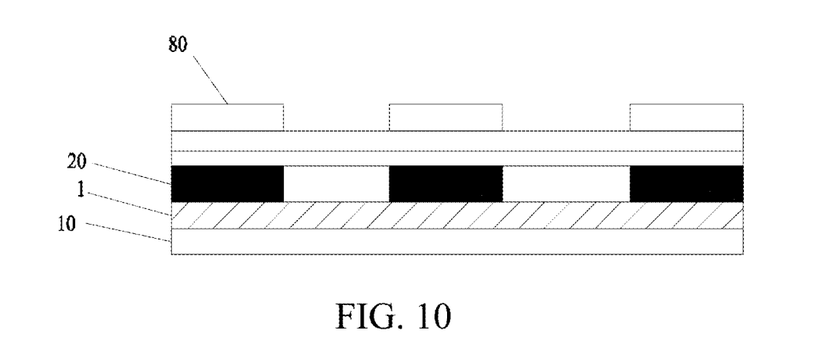
FIG. 10 is a schematic diagram after a second encapsulation layer is formed according to an embodiment of the present disclosure.

(3) An encapsulation thin film material is deposited on the barrier layer 70 on the glass carrier plate 10 with the aforementioned structure formed, and the encapsulation thin film material is formed into a second encapsulation layer 80, wherein the second encapsulation layer 80 is disconnected in a groove area of the substrate 1, as shown in FIG. 10.

Figure 11:
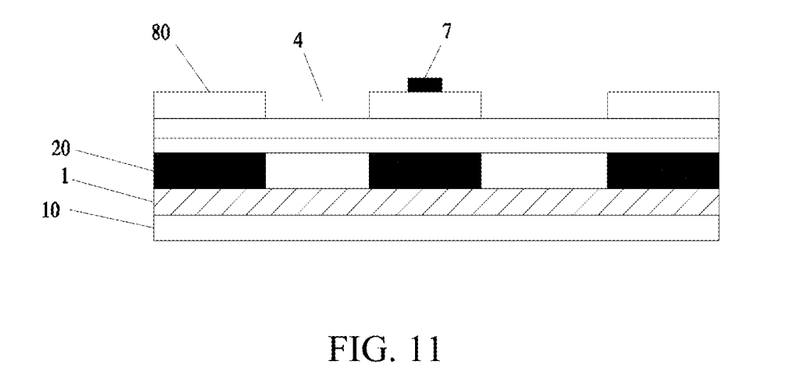
FIG. 11 is a second schematic diagram after a bridge is formed according to an embodiment of the present disclosure.
Figure 12:
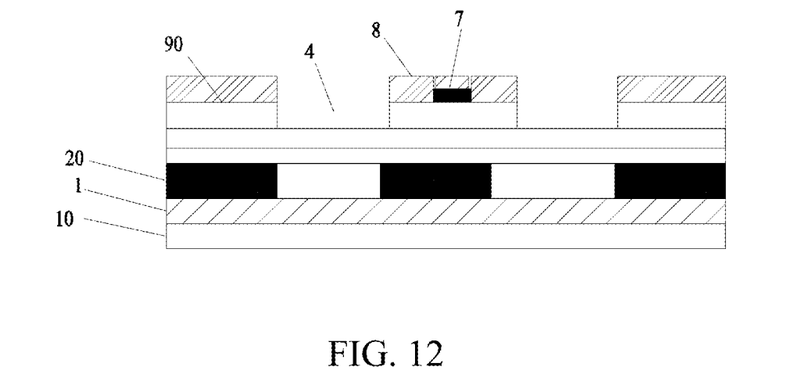
FIG. 12 is a second schematic diagram after an insulating layer is formed according to an embodiment of the present disclosure.

(4) A second metal thin film is deposited on the second encapsulation layer 80 on the glass carrier plate 10 with the aforementioned structure formed. The second metal thin film is patterned by a patterning process and a bridge 7 is formed on the second encapsulation layer 80, as shown in FIG. 11.

(5) An insulating layer 8 is formed on the bridge 7 on the glass carrier plate 10 with the aforementioned structure is formed, wherein the insulating layer 8 is disconnected in the groove area of the substrate 1 and a fourth via is provided in the insulating layer 8, and the fourth via is communicated with the bridge 7, as shown in FIG. 7.

Figure 13:
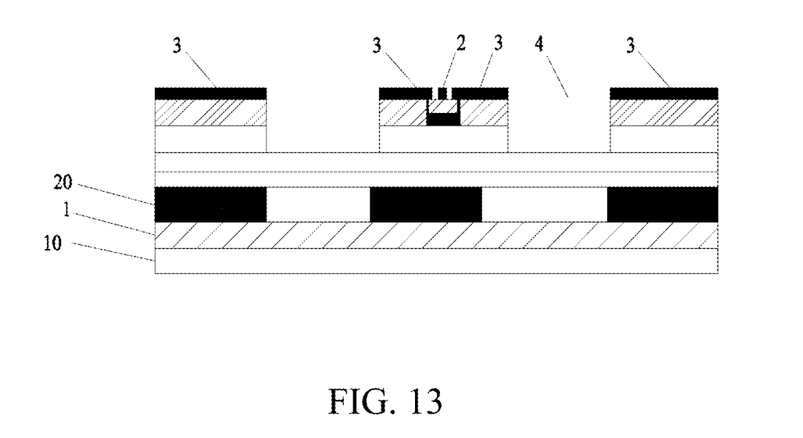
FIG. 13 is a schematic diagram after a first touch electrode and a second touch electrode are formed according to an embodiment of the present disclosure.

(6) A third metal thin film is deposited on the insulating layer 8 on the glass carrier plate 10 with the aforementioned structure formed. The third metal thin film is patterned by a patterning process, and first touch electrodes 2 and second touch electrodes 3 are formed on the insulating layer 8, and any adjacent second touch electrodes 3 are connected to the bridge 7 by the via, as shown in FIG. 13.

Figure 14:
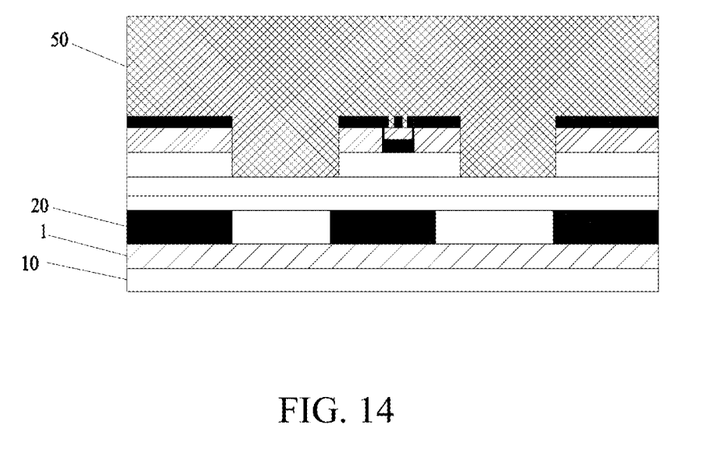
FIG. 14 is a second schematic diagram after a protective layer is formed according to an embodiment of the present disclosure.

(7) A protective layer 50 covering the first touch electrodes 2 and the second touch electrodes 3 is formed on the insulating layer 8 on the glass carrier plate 10 with the aforementioned structure formed, as shown in FIG. 14. A material of the protective layer 50 may be, for example, one or more of silicon oxide, silicon nitride and silicon oxynitride and may be used for protecting the touch structure and make an upper surface of the touch structure planar, so as to facilitate the subsequent preparation of other film layers on the touch substrate.

It can be seen from the structure of the touch panel and the aforementioned preparation process according to the embodiment of the present disclosure that when the touch panel provided by the embodiment of the present disclosure is flexibly deformed, change of the coupling capacitance between the touch electrodes is reduced, while the touch electrodes are avoided from being broken during flexible deformation.

On a basis of the technical concept of the above touch panel, an embodiment of the present application further provides a method for preparing the touch panel. The method for preparing the touch panel according to the embodiment of the present disclosure includes:

forming grooves on a substrate;

forming multiple first touch electrodes provided at intervals and multiple second touch electrodes provided at intervals on the substrate, such that the first touch electrodes and the second touch electrodes are insulated from each other, and the first touch electrodes and the second touch electrodes are located in peripheral areas of the grooves.

The detailed preparation process of the touch panel according to the embodiment of the present disclosure is already described in details in the aforementioned exemplary embodiments, which will not be repeated here.

An embodiment of the present disclosure further provides a display device including the touch panel according to the embodiments described above. The display device may be any product or component with a display function, such as a mobile phone, a tablet computer, a television, a display, a laptop computer, a digital photo frame, and a navigator, or product or component with functions of VR, AR and 3D display.

The drawings of the present disclosure only involve the structures involved in the present disclosure, and the other structures may refer to conventional designs. The embodiments in the present disclosure, i.e., the features in the embodiments, can be combined to obtain new embodiments if there is no conflict.

Those of ordinary skills in the art should know that modifications or equivalent replacements may be made to the technical solutions of the present disclosure without departing from the spirit and scope of the technical solutions of the present disclosure, and the modifications or equivalent replacements shall all fall within the scope of the claims of the present disclosure.

The invention claimed is:

1. A touch panel, comprising a substrate, a plurality of first touch electrodes provided at intervals and a plurality of second touch electrodes provided at intervals on a same layer on the substrate, wherein adjacent second touch electrodes or adjacent first touch electrodes are electrically connected by a bridge, and a plurality of grooves are further provided on the substrate, at least one groove is surrounded by a plurality of bridges, at least one of the plurality of bridges is located between adjacent grooves, wherein the touch panel further comprises a plurality of sub-pixels provided on the substrate, and the plurality of sub-pixels are disposed in an area outside of an area where the at least one groove is surrounded by the plurality of bridges.

2. The touch panel according to claim 1, further comprising a protective layer covering the first touch electrodes and the second touch electrodes, and the protective layer is filled in the grooves.

3. The touch panel according to claim 1, wherein both the first touch electrodes and the second touch electrodes are in a grid structure.

4. The touch panel according to claim 3, wherein the grid structure is provided on the sub-pixels.

5. The touch panel according to claim 4, wherein in the grid structure, each grid corresponds to one or one group of sub-pixels, and a projection of the one or the group of sub-pixels on a plane where the grid is located falls into a corresponding grid.

6. The touch panel according to claim 4, wherein a sub-pixel comprises a drive structure layer provided on the substrate and a light-emitting structure layer provided on the drive structure layer, the light-emitting structure layer is used for emitting display light, the drive structure layer is connected to the light-emitting structure layer for controlling and driving the light-emitting structure layer.

7. The touch panel according to claim 1, wherein the first touch electrodes and the second touch electrodes are located on a same side of an insulating layer, wherein the bridge, and the first touch electrodes and the second touch electrodes are provided on two sides of the insulating layer respectively.

8. The touch panel according to claim 1, wherein the substrate comprises a sub-pixel area and a peripheral area located around the sub-pixel area, and adjacent first touch electrodes and/or adjacent second touch electrodes are connected in the peripheral area.

9. The touch panel according to claim 1, wherein the touch panel further comprises a floating electrode provided on the substrate, and the floating electrode is provided on the same layer as the first touch electrodes and the second touch electrodes, and the floating electrode is insulated from the first touch electrodes and the second touch electrodes.

10. The touch panel according to claim 1, wherein the first touch electrodes and the second touch electrodes are insulated from each other.

11. The touch panel according to claim 1, wherein an orthographic projection of the first touch electrodes and the second touch electrodes on the substrate does not overlap with an orthographic projection of the grooves on the substrate.

12. The touch panel according to claim 1, wherein the touch panel further comprises an encapsulation layer and a buffer layer, and the encapsulation layer and a second buffer layer are filled in the grooves.

13. The touch panel according to claim 7, wherein a via is provided in the insulating layer, and the via is communicated with one of the plurality of bridges.

14. The touch panel according to claim 13, wherein the adjacent second touch electrodes are connected to the bridge by the via.

15. The touch panel according to claim 1, wherein the plurality of grooves are surrounded by the plurality of bridges.

16. A display device, comprising the touch panel according to claim 1.

* * * * *